United States Patent [19]
McKenzie

[11] Patent Number: 5,512,088
[45] Date of Patent: Apr. 30, 1996

[54] SEPARATOR

[75] Inventor: Robert J. McKenzie, Airdrie, Canada

[73] Assignee: Interglobe Gas Technology, Inc., Calgary, Canada

[21] Appl. No.: 264,658

[22] Filed: Jun. 23, 1994

[51] Int. Cl.$^6$ ............................ B01D 46/30; B01D 53/04
[52] U.S. Cl. ................... 96/152; 96/109; 96/192; 55/219; 55/518
[58] Field of Search ....................... 95/24, 117, 241, 95/253, 273, 274; 96/118, 152, 188–192, 219; 55/219, 518

[56] References Cited

U.S. PATENT DOCUMENTS

| 913,325 | 2/1909 | Touzimsky | 96/119 |
|---|---|---|---|
| 996,771 | 7/1911 | King et al. | 96/118 |
| 1,096,223 | 5/1914 | Cochran | 96/118 |
| 1,096,224 | 5/1914 | Cochran | 96/118 |
| 1,127,420 | 2/1915 | Fairburn | 96/118 |
| 1,268,053 | 5/1918 | Poetschke | 96/118 |
| 2,180,119 | 11/1939 | Osterloh et al. | 96/152 |
| 2,193,209 | 3/1940 | Sandberg | 55/219 |
| 2,196,021 | 4/1940 | Merrill | 96/118 |
| 2,493,095 | 1/1950 | Williams | 96/188 X |
| 2,507,273 | 5/1950 | Schultz | 55/219 |
| 2,788,080 | 4/1957 | Guarin | 96/189 |
| 2,812,034 | 11/1957 | McKelvey, Jr. | 96/190 |
| 3,197,946 | 8/1965 | Taylor | 95/273 |
| 3,312,044 | 4/1967 | McCarter | 96/189 X |
| 3,465,503 | 9/1969 | Henderson | 96/118 X |
| 3,626,673 | 12/1971 | Stockton et al. | 96/189 |
| 3,722,189 | 3/1973 | Tourtellotte | 55/389 |
| 4,302,227 | 11/1981 | Miller | 55/269 |
| 4,744,806 | 5/1988 | Ozolins et al. | 95/273 |
| 4,755,194 | 7/1988 | Rooker et al. | 96/188 X |
| 4,913,942 | 4/1990 | Jick | 96/121 |
| 5,037,454 | 8/1991 | Mann | 55/35 |
| 5,038,815 | 8/1991 | Palmer | 137/237 |
| 5,061,300 | 10/1991 | alexander, III | 95/24 |
| 5,108,472 | 4/1992 | Murray, Sr. | 55/219 |
| 5,145,497 | 9/1992 | Maeda | 55/219 |

FOREIGN PATENT DOCUMENTS

| 702239 | 1/1965 | Canada | 95/117 |
|---|---|---|---|
| 1125671 | 6/1982 | Canada . | |
| 25159 | 10/1956 | Germany | 96/152 |
| 3020034 | 12/1981 | Germany | 96/118 |
| 61-178018 | 8/1986 | Japan | 96/152 |

Primary Examiner—Robert Spitzer
Attorney, Agent, or Firm—John R. Casperson

[57] ABSTRACT

A filtering device well adapted for filtering moisture from a natural gas stream is formed by a tubular housing containing a bed of particulate material, such as gravel. In one embodiment, particulate material is positioned in an upper portion of the housing and a liquid reservoir is provided in a lower portion of the housing. In another embodiment, the housing is packed full of particulate material and the liquid reservoir is provided by a boot depending from the housing.

15 Claims, 3 Drawing Sheets

SEPARATOR

BACKGROUND OF THE INVENTION

This invention relates to a separator. In one aspect, this invention relates to a separator for removing impurities from a gas stream.

Moisture is difficult to remove from natural gas streams. The separation of moisture from natural gas streams is desirable to improve the efficiency of the gas as a fuel and to prevent breakdowns in the gas transportation system. Breakdowns can occur as a result of the accumulation of moisture in parts of the system, corrosion catalyzed by moisture, and freeze ups.

Devices to filter moisture and other materials from gas streams are known. However, existing devices employ a pair of pressure vessels and are expensive to fabricate and transport. A compact and inexpensive gas filtering device which is easy to assemble would be very desirable.

OBJECTS OF THE INVENTION

It is an object of this invention to provide a compact and inexpensive device for filtering impurities from natural gas streams.

It is another object of this invention to provide a gas filtering device which is easy to fabricate.

It is another object of this invention to provide a gas filtering unit which does not require a regeneration unit or regeneration cycles.

It is another object of this invention to provide a gas filtering process which does not result in the production of waste materials which cause a disposal problem.

SUMMARY OF THE INVENTION

In accordance with one embodiment of the invention, a filtering device having an internal liquid reservoir is formed by a tubular vessel. The tubular vessel is formed by a sidewall having a longitudinal axis, an inside surface, and an outside surface. The vessel has a top side, a bottom side, a first end and a second end. An inlet is positioned at the first end of the tubular vessel to admit the gas stream to be treated. An outlet is positioned at the second end of the tubular vessel to exhaust the treated gas stream. A first baffle forms a partition across the inside surface of the vessel adjacent to the first end of the vessel. The first baffle has perforations extending therethrough. A second baffle forms a partition across the inside surface of the vessel adjacent to the second end of the vessel. The second baffle has perforations extending therethrough. At least one divider plate forms a partition across the inside surface of the tubular vessel. The divider plate extends generally longitudinally in the vessel between the first baffle and the second baffle and divides the inside of the vessel into an upper chamber and a lower chamber. The upper chamber forms a filter chamber and the lower chamber forms a liquid reservoir. A major portion of the perforations through the first baffle and the second baffle open into the filter chamber. The divider plate has perforations therethrough to permit liquid to drain from the filter chamber into the liquid reservoir. A bed of particulate filter material is positioned in the filter chamber. The device is very compact because it lacks an external reservoir and it is well suited for filtering impurities from natural gas. It is easy to assemble because the baffles and divider plate can be preassembled and slid into the tubular member.

In accordance with another embodiment of the invention, a filtering device is formed from a tubular vessel. The tubular vessel formed by a sidewall having a longitudinal axis, an inside surface and outside surface. The device has a top side, a bottom side, a first end and a second end. An inlet for the gas stream to be treated is positioned at the first end of the tubular vessel. An outlet for the exhaust of the gas stream which has been treated is positioned at the second end of the tubular vessel. A first perforated baffle forms a partition across the inside surface of the vessel. The first perforated baffle is posititioned adjacent to the first end of the tubular vessel. A second perforated baffle forms a partition across the inside surface of the vessel. The second perforated baffle is positioned adjacent to the second end of the tubular vessel. A filter chamber is defined by the first perforated baffle, the second perforated baffle and the inside surface of the sidewall of the tubular vessel. A bed of particulate filter material is positioned in the filter chamber. A means for defining at least one liquid reservoir is connected to the outside surface of the sidewall on the bottom side of the tubular vessel. A drain extends through the sidewall and forms a liquid flow path between the filter chamber and the liquid reservoir. In a preferred embodiment, the liquid reservoir is formed by a boot and is provided with a means for automatically controlling the liquid level in the boot. The apparatus is compact, inexpensive, requires low maintenance, and is well adapted for removing impurities such as moisture from natural gas streams. Because it has only two internal baffles, it is simple to fabricate.

In another embodiment of the invention, there is provided a process for separating liquids from a natural gas stream which contains liquid. The process is carried out by introducing the gas stream into a first end of an in line filter. The filter contains a filter medium having a particle size in the range of from about 3 mm to about 20 mm. The liquids are coalesced on the filter medium thereby forming a treated gas stream. The coalesced liquids are drained from the filter medium. The treated gas stream is then exhausted from the second end of the in-line filter. The process is characterized by high efficiency and low pressure drop.

In another embodiment of the invention, there is provided a tower-type separator which is very simple, inexpensive and effective. The device comprises a tubular vessel formed by a sidewall having a longitudinal axis, an inside surface, an outside surface, a top end, and a bottom end. An inlet is provided through the sidewall between the bottom end and the top end. An outlet is provided at the top end of the vessel. A divider plate forms a partition across the inside surface of the tubular vessel between the inlet and the bottom end. The divider plate divides the inside of the tubular vessel into an upper chamber and a lower chamber. The upper chamber forms a filter chamber. The lower chamber forms a liquid reservoir. The divider plate has perforations to permit liquid drainage from the filter chamber to the liquid reservoir. A bed of particulate filter material is positioned in the filter chamber.

The apparatus may be used in a process for separating liquids from a natural gas stream which contains liquids. The process is carried out by introducing the gas stream into a lower end of a filter chamber containing a filter medium having a particle size in the range of from about 3 mm to about 20 mm. The gas stream is flowed upwardly through the filter medium to a gas exhaust at or near the upper end of said filter chamber. The liquids contained in the gas stream are coalesced on the filter medium and a treated gas stream is formed. The coalesced liquids are drained from the filter medium. The treated gas stream is exhausted from the upper end of the filter.

DETAILED DESCRIPTION OF THE PREFERRED EMBODIMENTS

Figure 1:
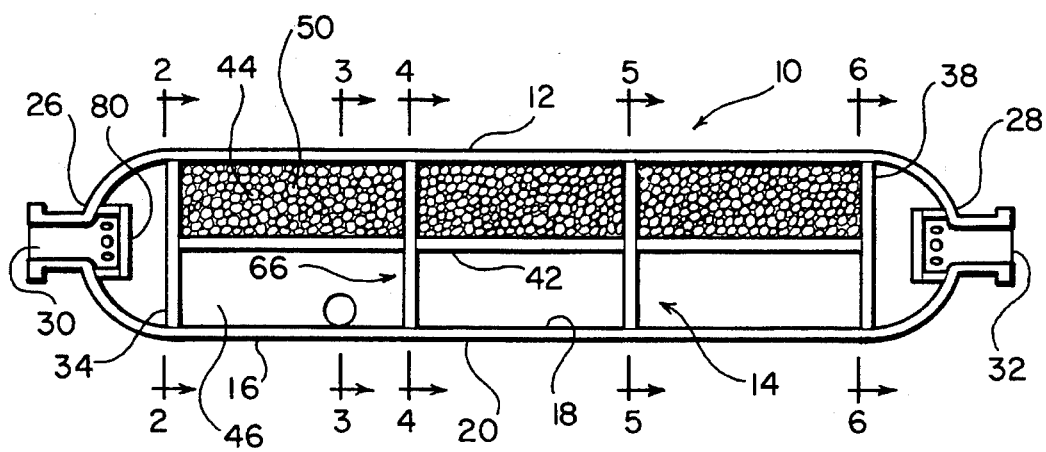
FIG. 1 is a side sectional view of a device embodying certain features of one embodiment of the invention.
Figures 2, 4:
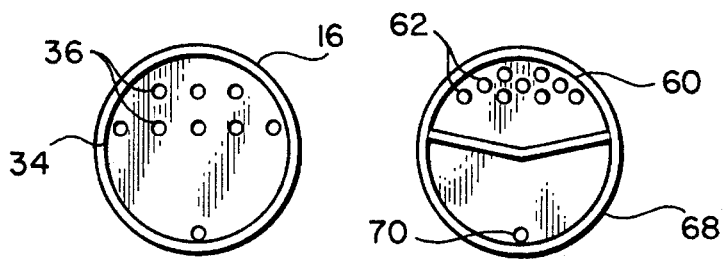
FIGS. 2 through 6 are cross sectional views of the device of FIG. 1 as would appear when taken along the indicated cut lines.
Figure 5:
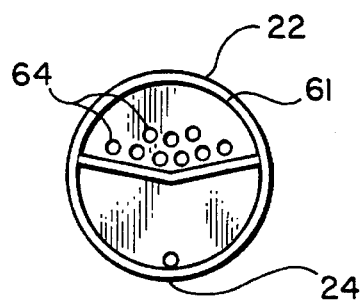
Figure 3:
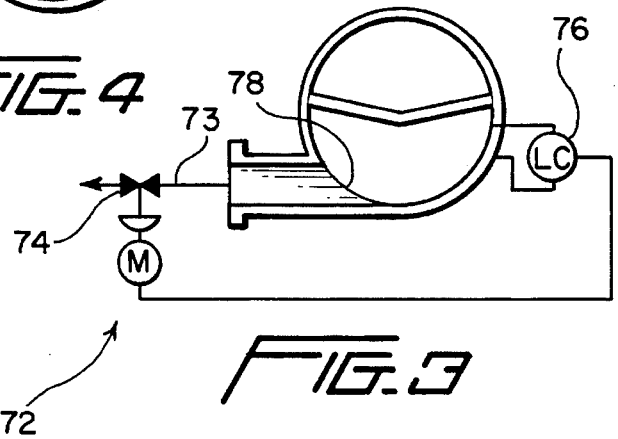
Figure 6:
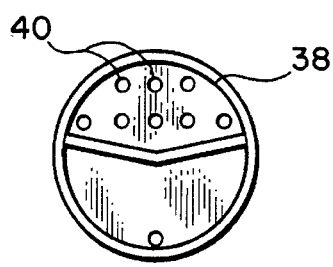
Figure 7:
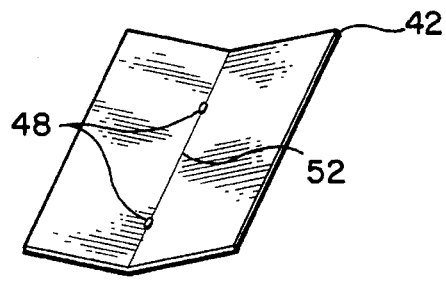
FIG. 7 is an isometric view of one of the components of the device shown in FIG. 1.
Figure 8:
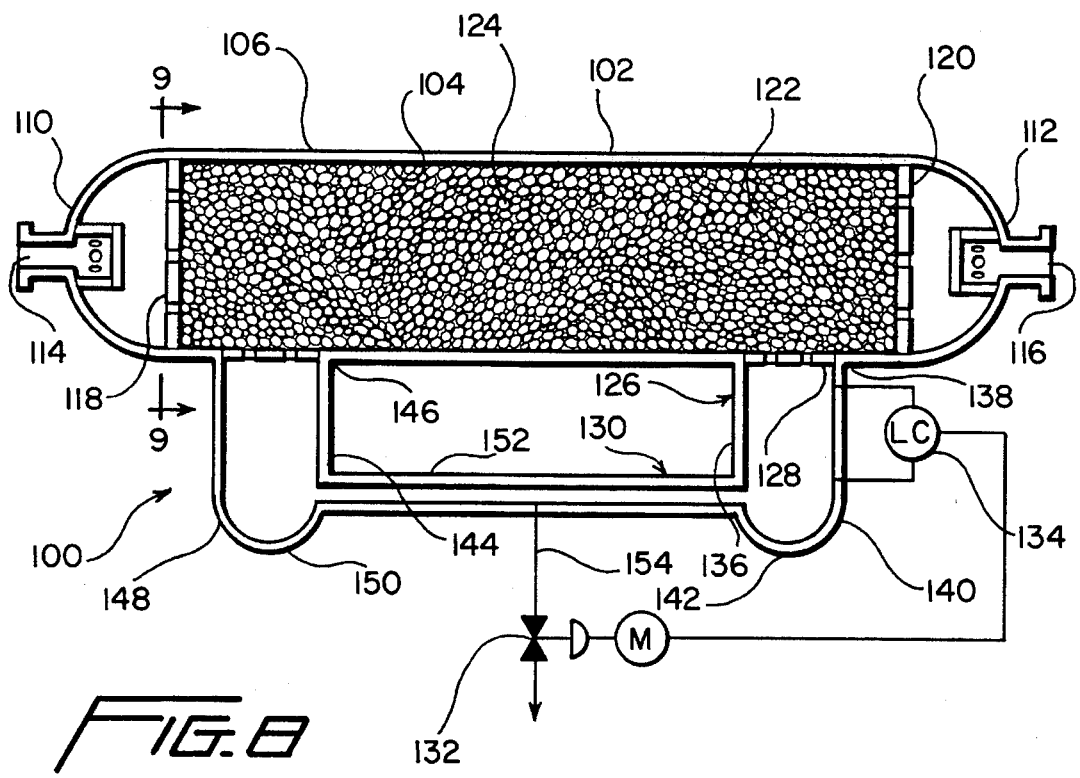
FIG. 8 is a cross sectional view of a second embodiment of device embodying certain features of another embodiment of the invention.
Figure 9:
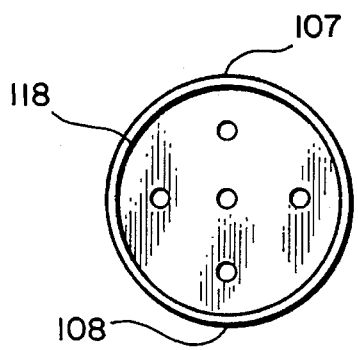
FIG. 9 is a cross sectional view of the device of FIG. 8 taken along the indicated lines.

Water in natural gas is measured in pounds per million cubic feet of gas. A typical well may produce 85 lbs/mu.cf of water. In order to make natural gas transportable through a pipeline system, the water content in Canada would be no more than five lbs./mu.cf. simply because water freezes at cold temperatures. The United States specifications are from seven to twenty-two lbs./mu.cf. of gas. The temperature drop in the southern gas producing states and countries seldom stays below freezing for any length of time.

In order to obtain the necessary standard to transport natural gas in pipelines, a dehydration system using glycol and chemicals has been used exclusively in the gas industry to date to remove water. These systems are extremely expensive, manpower intensive, environmentally unfriendly, and require extensive yearly refits. A typical dehydration unit will cost approximately 100,000 USD. This technology has not really changed for almost thirty years and now it will not be long before legislation outlaws the existing equipment as environmentally unsafe.

The natural gas industry has not had an economically viable alternative to the glycol dehydrator until now. We have developed an alternative system which we feel will replace most of the existing, outmoded equipment. As of yet, there is no other system comparable to ours which benefits the customer as to cost, maintenance, and reliability. The cost of one of our units, (comparable to the above glycol equipment) is approximately 60,000 USD and requires no maintenance, has no power requirements, and burns no natural gas, leaving a cleaner environment.

In accordance with one embodiment of the invention, a filtering device 10 is formed by a tubular vessel 12 and is provided with an internal liquid reservoir 14. The tubular vessel 12 is formed by a sidewall 16 having a longitudinal axis, an inside surface 18, and an outside surface 20. The vessel has a top side 22, a bottom side 24, a first end 26 and a second end 28. An inlet 30 is positioned at the first end 26 of the tubular vessel 12 to admit the gas stream to be treated. An outlet 32 is positioned at the second end 28 of the tubular vessel 12 to exhaust the treated gas stream. A first baffle 34 forms a partition across the inside surface of the vessel adjacent to the first end 26 of the vessel. The first baffle has perforations 36 extending therethrough. A second baffle 38 forms a partition across the inside surface of the vessel adjacent to the second end 28 of the vessel. The second baffle 38 has perforations 40 extending therethrough. At least one divider plate 42 forms a partition across the inside surface of the tubular vessel 12. The at least one divider plate 42 extends generally longitudinally in the vessel 12 between the first baffle 34 and the second baffle 38 and divides the inside of the vessel into an upper chamber 44 and a lower chamber 46. The upper chamber 44 forms a filter chamber and the lower chamber 46 forms the liquid reservoir 14. At least a major portion of the perforations 36 and 40 in the first baffle 34 and the second battle 38 open into the filter chamber 44. The divider plate 42 has perforations 48 therethrough to permit liquid to drain from the filter chamber to the liquid reservoir. A bed 50 of particulate filter material is positioned in the filter chamber.

Preferably, the divider plate 42 has a fold 52 positioned generally along the longitudinal axis of the tubular vessel so that the divider plate 42 forms a trough. More preferably, a major portion of the perforations 48 through the divider plate 42 to permit the liquid drainage from the filter chamber to the liquid reservoir are positioned along the fold 52.

It is also preferred that a major portion of the perforations 36 extending through the first baffle 34 and a major portion of the perforations 40 extending through the second baffle 38 lie in sector shaped areas extending toward the top side of the tubular vessel. The perforations can have a wide range of sizes but will generally have a diameter somewhat smaller than the size of the filter media.

In order to prevent fluid channeling, it is desirable to utilize a plurality of baffles in the upper chamber 44. Preferably, at least one sector shaped third baffle such as baffles 60 and/or 61 are positioned in the filter chamber 44 and forms a partition across the filter chamber. The at least one sector shaped, third baffle has perforations 62 and 64 therethrough to distribute gas flow through the filter chamber 44. The perforations can be varied in position from baffle to baffle to cause the gas stream to sweep back and forth during its passage through the bed.

The filter bed 50 can have great weight. Preferably, at least one support means 66 is positioned in the liquid reservoir 14 extending between the inside surface 18 of the tubular vessel and the divider plate 42. The divider plate is thus preferably supported at a position between the first baffle 34 and the second baffle 38. The support means 66 preferably comprises a partition 68 having at least one perforation 70 therethrough adjacent to the inside surface 18 of the bottom side 24 of the tubular vessel 12. The perforations is to permit liquid drainage between the compartments defined between the partitions in the liquid reservoir.

Most preferably, the device 10 is provided with a means 72 for maintaining a liquid level in the liquid reservoir above the position of the at least one perforation 70. This prevents gas from flowing through the lower chamber 46 and bypassing the filter bed 50. In one embodiment or the invention, the means 72 comprises a conduit 73, a valve 74, and a level switch 76. The conduit 73 is connected to the sidewall of the tubular vessel 12 for removing liquid from the liquid reservoir 14. The valve 74 is operably associated with the conduit 73 so as to control flow therethrough.

The sidewall of the tubular vessel further defines a drain 78 extending through the sidewall between the liquid reservoir 14 and the conduit 73. The level control switch 76 is operably associated with the liquid reservoir 14 and the valve 74 so as to open and close the valve 74 responsively to predetermined upper and lower liquid levels in the liquid reservoir 14.

In a further preferred embodiment of the invention, an inlet nozzle 80 is positioned at the inlet 30 to divide the incoming gas stream into a plurality of generally radially outwardly directed streams.

Generally speaking, the particulate filter material has a particle size primarily in the range of from about 3 mm to about 50 mm. Usually, the particle size is primarily in the range of from about 3 mm to about 20 mm. Preferably, the particle size is primarily in the range of from about 4 to about 10 mm. Generally speaking, particle size is selected based on pressure drop considerations.

The particulate filter material can comprise a hygroscopic mineral. It should be selected so that it will not deteriorate under conditions found in the unit. Many suitable filter materials contain calcium and/or silicon in a chemically bound form, usually in association with oxygen or sulfur. Examples of suitable materials include calcium sulphate, calcium silicate, calcium chlorate, calcium sulphite, granite, and. quartz. Zeolitic materials, which generally comprise crystalline aluminosilicate materials, are also suitable. Natural zeolites are preferred.

In accordance with another embodiment of the invention, a device 100 for filtering impurities from a natural gas stream is formed from a tubular vessel 102. The tubular vessel 102 formed by a sidewall having a longitudinal axis, an inside surface 104 and outside surface 106. The device 100 has a top side 107, a bottom side 108, a first end 110 and a second end 112. An inlet 114 for the gas stream to be treated is positioned at the first end 110 of the tubular vessel. An outlet 116 for the exhaust of the gas stream which has been treated is positioned at the second end 112 of the tubular vessel. A first perforated baffle 118 forms a partition across the inside surface of the vessel. The first perforated baffle is positioned adjacent to the first end 110 of the tubular vessel. A second and perforated baffle 120 forms a partition across the inside surface of the vessel. The second perforated baffle 120 is positioned adjacent to the second end 112 of the tubular vessel. A filter chamber 122 is defined by the first perforated baffle 118, the second perforated baffle 120 and the inside surface 104 of the sidewall of the tubular vessel. A bed of particulate filter material 124 is positioned in the filter chamber 122. A means 120 for defining at least one liquid reservoir is connected to the outside surface of the sidewall on the bottom side of the tubular vessel. A drain 128 extends through the sidewall and forms a liquid flow path between the filter chamber 122 and the means 126 defining the liquid reservoir.

In a preferred embodiment of the invention, the apparatus 100 further comprises a conduit means 130 for forming a flow path, a valve 132, and a level control switch 134. The conduit means 130 extends from the at least one means 126 for defining the at least one liquid reservoir, preferably from the boot. The valve 132 is operably associated with the conduit means 130 for forming the flow path. The level control switch 134 is operably associated with the at least one means 126 for defining the liquid reservoir and the valve 132 so as to open and close the valve responsively to predetermined upper and lower liquid levels in the at least one liquid reservoir.

It is further preferred that the at least one liquid reservoir 126 comprises a first tubular member 136 extending generally radially away from the longitudinal axis of the tubular vessel 102. The first tubular member 136 has a first end 138 and a second end 140. The first end 138 is connected to the sidewall of the tubular vessel. A first end closure 142 is positioned on the second end 140 of the first tubular member 136. These structural features together constitute a first boot. Preferably, the length of the tubular member 136 is less than three times the diameter of the tubular vessel 102.

It is further preferred that the apparatus comprise a pair of boots. To this end, a second tubular member 144 extends generally radially away from the longitudinal axis of the tubular vessel in a direction generally parallel to the first tubular member 136. The second tubular member is spaced apart from the first tubular member. The second tubular member has a first end 146 and a second end 148. The first end is connected to the sidewall of the tubular vessel. A second end closure 150 is positioned on the second end of the second tubular member. The second tubular member and the second end closure thus form a second boot in a preferred embodiment of the invention. The liquid level control switch 134 is preferably operably associated with the first boot so as to control the liquid level therein.

Preferably, the means 130 for forming a flow path comprises a first conduit 152 forming a flow path between the second end 140 of the first tubular member 136 and the second end 148 of the second tubular member 144. A second conduit 154 forms a flow path between the first conduit 152 and the valve 132.

The particulate material forming the bed 124 can be as previously described.

In another embodiment of the invention, there is provided a process for separating liquids from a natural gas stream which contains liquids. The process is carried out by introducing the gas stream into a first end of an in line filter. The filter contains a filter medium having a paretic size in the range of from about 3 mm to about 20 mm. The liquids are coalesced on the filter medium thereby forming a treated gas stream. The coalesced liquids are drained from the filter medium. The treated gas stream is then exhausted from the second end of the in-line filter. Usually, water is the liquid removed from the stream. The filter medium can be as previously described. The process can be carried out in equipment as previously described.

Figure 10:
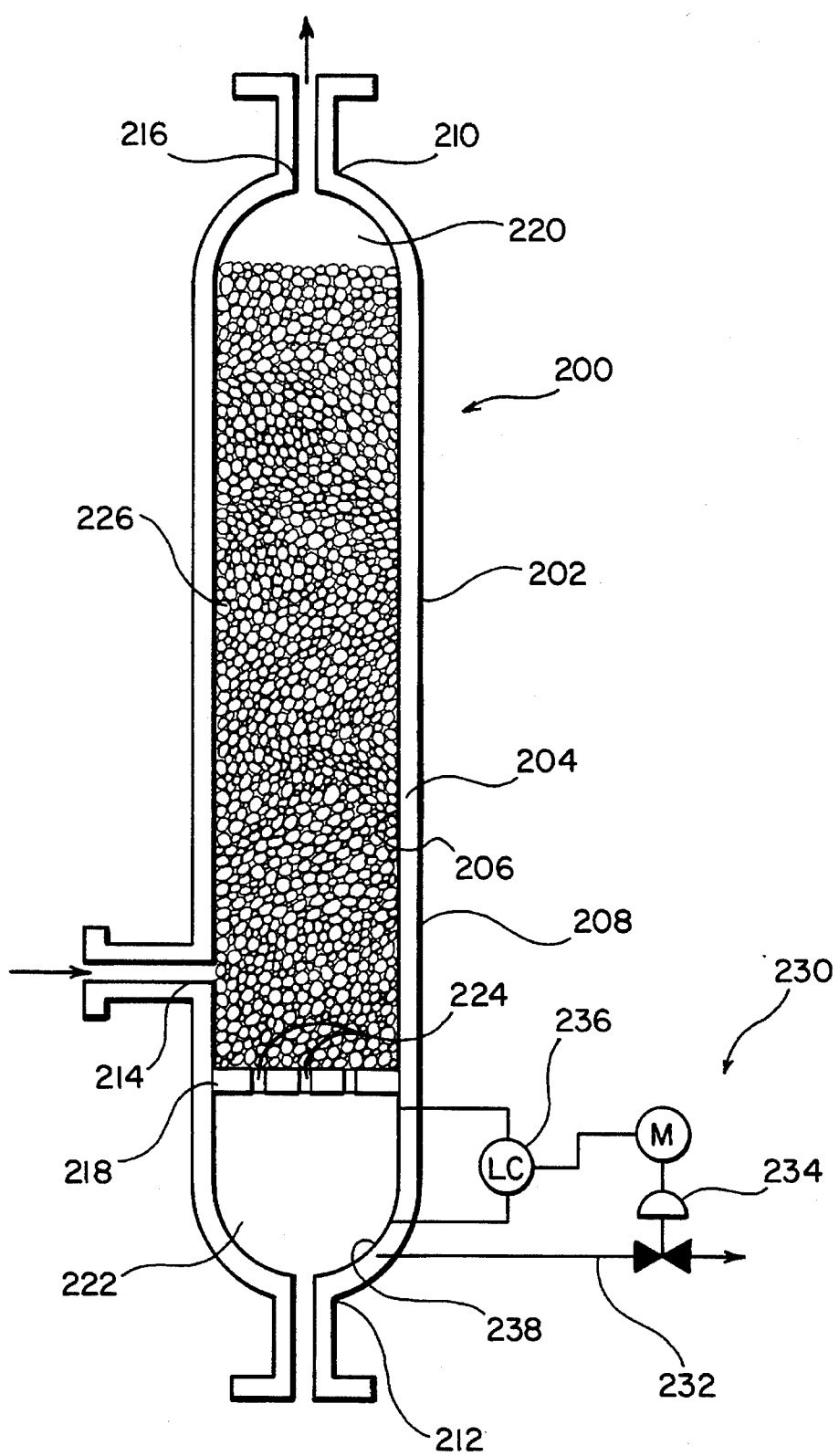
FIG. 10 is a cross sectional view of a third embodiment of a device embodying certain features of the invention.

In another embodiment of the invention as best illustrated by FIG. 10, there is provided a filtering device 200 having a tower configuration. Providing the filtering device in the form of a generally vertically oriented tower is expedient and effective. The apparatus comprises a tubular vessel 202 formed by a sidewall 204 having a longitudinal axis, an inside surface 206, an outside surface 208, a top end 210, and a bottom end 212. An inlet 214 is provided through the sidewall between the bottom end 212 and the top end 210. An outlet 216 is provided at the top end 210 of the vessel. A divider plate 218 forms a partition across the inside surface of the tubular vessel between the inlet 214 and the bottom end 212. The divider plate 218 divides the inside of the tubular vessel into an upper chamber 220 and a lower chamber 222. The upper chamber 220 forms a filter chamber. The lower chamber 222 forms a liquid reservoir. The divider plate 218 has perforations 224 to permit liquid drainage from the filter chamber to the liquid reservoir. A bed 226 of particulate filter material is positioned in the filter chamber. The particulate filter material can have characteristics as previously described herein.

In a preferred embodiment of the invention, the device 200 is provided with a means 230 for maintaining a liquid level in the liquid reservoir. The means 230 comprises a conduit 232, valve 234, and a level control switch 236. The conduit 232 is connected to the sidewall of the tubular vessel between the divider plate 218 and the bottom end 212 for removing liquid from the liquid reservoir. The valve 234 is operably associated with the conduit 232. The sidewall of the tubular vessel further defines a drain 238 extending through the sidewall between the liquid reservoir and the conduit. The level control switch 236 is operably associated with the lower chamber and the valve so as to open and close the valve 234 responsively to predetermined upper and lower liquid levels in the liquid reservoir. The elements provide a means for maintaining a liquid level in the liquid reservoir between predetermined limits.

The apparatus may be used in a process for separating liquids from a natural gas stream which contains liquids. The process is carried out by introducing the gas stream into a lower end or a filter chamber containing a filter medium having a particle size in the range of from about 3 mm to about 20 mm. The gas stream is flowed upwardly through the filter medium to a gas exhaust at or near the upper end of said filter chamber. The liquids contained in the gas stream are coalesced on the filter medium and a treated gas stream is formed. The coalesced liquids are drained from the filter medium. The treated gas stream is exhausted from the upper end of the filter. In a preferred embodiment of the invention, the liquid drained from the filter medium is collected in a liquid reservoir positioned beneath the lower end of the filter chamber, and from time to time drained therefrom.

What is claimed is:

1. Apparatus comprising
   a. a tubular vessel formed by an sidewall having a longitudinal axis, an inside surface, an outside surface, a top side, and a bottom side, a first end and a second end with an inlet at the first end and an outlet at the second end;
   b. a first perforated baffle forming a partition across the inside surface of the vessel positioned adjacent to the first end;
   c. a second perforated baffle forming a partition across the inside surface of the vessel positioned adjacent to the second end, a filter chamber being defined by the first perforated baffle, the second perforated baffle and the inside surface of the sidewall of the tubular vessel;
   d. a bed of particulate filter material filling the filter chamber; and
   e. means for defining at least one liquid reservoir connected to the outside surface of the sidewall on the bottom side of the tubular vessel, said vessel having at least one drain extending through the sidewall forming a liquid flow path between the filter chamber and each said at least one liquid reservoir;

said apparatus further comprising a means for forming a low path extending from the at least one means for defining the at least one liquid reservoir;

a valve operably associated with the means for forming a flow path;

a level control switch operably associated with the at least one means for defining the liquid reservoir and the valve so as to open and close the valve responsively to predetermined upper and lower liquid levels in the at least one liquid reservoir;

wherein the means for defining the at least one liquid reservoir comprises a first tubular member extending generally radially away from the longitudinal axis of the tubular vessel, said first tubular member having a first end and a second end, the first end being connected to the sidewall of the tubular vessel;

a first end closure positioned on the second end of the first tubular member;

a second tubular member extending generally radially away from the longitudinal axis of the tubular vessel in a direction generally parallel to the first tubular member, said second tubular member having a first end and a second end, the first end being connected to the sidewall of the tubular vessel, said second tubular member being spaced apart from the first tubular member; and a second end closure positioned on the second end of the second tubular member;

wherein the means for forming a flow path comprises a first conduit forming a flow path between the second end of the first tubular member and the second end of the second tubular member; and a second conduit forming a flow path between the first conduit and the valve;

wherein the first tubular member and the first end closure form a first boot, the second tubular member and the second end closure form a second boot, and the liquid level control switch is operably associated with the first boot so as to control the liquid level therein.

2. Apparatus as in claim 1 wherein the particulate filter material comprises a hygroscopic mineral and a major portion of the particulate filter material has a particle size in the range of from about 3 mm to about 50 mm.

3. Apparatus as in claim 1 wherein the particulate filter material comprises calcium and/or silicon in chemically bound form and a major portion of the particulate filter material has a particle size in the range of from about 3 mm to about 20 mm.

4. Apparatus as in claim 1 wherein the particulate filter material is selected from the group consisting of calcium sulphate, calcium silicate, calcium chlorate, calcium sulphite, granite, quartz and zeolite.

5. Apparatus as in claim 1 wherein a major portion of the particulate filter material has a particle size in the range of from about 4 mm to 10 mm.

6. Apparatus comprising
   a. a tubular vessel formed by a sidewall having a longitudinal axis, an inside surface, an outside surface, a top side, a bottom side, a first end and a second end with an inlet at the first end and an outlet at the second end;
   b. a first baffle forming a partition across the inside surface of the vessel positioned adjacent to the first end of the tubular vessel, said first baffle having perforations extending therethrough;
   c. a second baffle forming a partition across the inside surface of the vessel positioned adjacent to the second end of the tubular vessel, said second baffle having perforations extending therethrough;
   d. a divider plate forming a partition across the inside surface of the tubular vessel, said divider plate extending generally longitudinally in said tubular vessel between the first baffle and the second baffle and dividing the inside of said tubular vessel into an upper chamber and a lower chamber, said upper chamber forming a filter chamber and said lower chamber forming a liquid reservoir, wherein a major portion of the perforations through the first baffle and the second baffle establish communication with the filter chamber, said divider plate having perforations therethrough to permit liquid drainage from the filter chamber to the liquid reservoir; and
   e. a bed of particulate filter material positioned in the filter chamber.

7. Apparatus as in claim 6 wherein the divider plate has a fold lying generally along side the longitudinal axis of the tubular vessel so that the divider plate forms a trough and a major portion of the perforations through the divider plate are positioned along the fold; and a major portion of the portions extending through the first baffle and a major portion of the perforations extending through the second baffle are positioned in sector shaped areas extending toward the top side of the tubular vessel.

8. Apparatus as in claim 7 further comprising at least one sector shaped third baffle positioned in the filter chamber and forming a partition across the filter chamber, said at least one sector shaped third baffle having perforations therethrough to distribute fluid flow through the filter chamber.

9. Apparatus as in claim 8 further comprising at least one support means positioned in the liquid reservoir extending between the inside surface of the tubular vessel and the divider plate to support the divider plate at a position between the first baffle and the second baffle.

10. Apparatus as in claim 9 wherein the at least one support means comprises a partition having at least one perforations therethrough adjacent to the inside surface of the bottom side of the tubular vessel.

11. Apparatus as in claim 10 further comprising means for maintaining a liquid level in the liquid reservoir above the position of the at least one perforation through the at least one partition, in order to prevent gas flow through the liquid reservoir.

12. Apparatus as in claim 11 further comprising a conduit connected to the sidewall of the tubular vessel for removing liquid from the liquid reservoir, and a valve operably associated with the conduit;

wherein the sidewall of the tubular vessel further defines a drain extending through the sidewall between the liquid reservoir and the conduit; and the means for maintaining a liquid level in the liquid reservoir above the position of the at least one perforation through the at least one partition comprises a level control switch operably associated with the at least one means liquid reservoir means and the valve so as to open and close the valve responsively to predetermined upper and lower liquid levels in the liquid reservoir.

13. Apparatus as in claim 12 wherein the particulate filter material comprises a hygroscopic mineral and a major portion of the particulate filter material has a particle size in the range of from about 3 mm to about 50 mm.

14. Apparatus as in claim 12 wherein the particulate filter material comprises calcium and/or silicon in chemically bound form and a major portion of the particulate filter material has a particle size in the range of about 3 mm to about 20 mm.

15. Apparatus as in claim 12 wherein the particulate filter material is selected from the group consisting of calcium sulphate, calcium silicate, calcium chlorate, calcium sulphite, granite, quartz and zeolite and a major portion of the filter material has a particle size in the range of from about 4 mm to about 10 mm.

\* \* \* \* \*